United States Patent [19]

Oka et al.

[11] 3,930,924
[45] Jan. 6, 1976

[54] PROCESS FOR MAKING IDENTIFICATION CARDS

[76] Inventors: Satoshi Oka, No. 205, Futaba-cho, Futatsugi, Matsudo, Chiba; Tawara Junro, No. 135, Oaza-Kumagawa, Fussa, Tokyo; Akira Ohmameuda, No. 89, Oheda, Kasukabe, Saitama; Kazumasa Uda, No. 9-3, Hisagi-cho, Tsogo, Yokohama, Kanagawa, all of Japan

[22] Filed: Feb. 28, 1973

[21] Appl. No.: 337,716

Related U.S. Application Data

[62] Division of Ser. No. 253,940, May 17, 1972, Pat. No. 3,897,964.

[52] U.S. Cl. ............ 156/268; 40/2.2; 156/277; 156/298; 283/7; 427/7; 427/276; 427/277
[51] Int. Cl.². B32B 31/18; B32B 31/20; B44C 1/22
[58] Field of Search ........ 156/268, 62, 58, 59, 277, 156/298; 283/7; 40/2.2; 33/23 R; 178/6.6 B; 346/77 R, 77 E, 135; 117/1, 8; 427/7, 270, 277, 276; 428/172

[56] References Cited
UNITED STATES PATENTS

| | | | |
|---|---|---|---|
| 2,699,720 | 1/1955 | Howey | 178/6.6 B |
| 2,881,246 | 4/1959 | Fairchild | 178/6.6 B |
| 2,986,598 | 5/1961 | Hell | 33/23 R |
| 3,217,643 | 11/1965 | Crissy et al. | 283/7 X |
| 3,578,538 | 5/1971 | Prosser et al. | 156/268 X |

*Primary Examiner*—Douglas J. Drummond
*Assistant Examiner*—M. G. Wityshyn
*Attorney, Agent, or Firm*—Mason, Fenwick & Lawrence

[57] ABSTRACT

A method of making an identification card which comprises making any required characters, designs and/or embossings on the base material of the card, further providing a colored layer on the bass material of the card and then engraving the colored layer and base to varying depths in the form of fine lines and points so that, by regulating the ratio of the surface areas of the engraved part and unengraved part, the differences in the color thickness and luster may be expressed to form an engraved image by which the user can be identified and which image has no projections thereon.

8 Claims, 12 Drawing Figures

PROCESS FOR MAKING IDENTIFICATION CARDS

This application is a division of co-pending application Ser. No. 253,940, filed May 17, 1972, now U.S. Pat. No. 3,897,964, IDENTIFICATION CARDS FOR MAKING THE SAME, Satoski OKA, et al., inventors.

The present invention relates to cards and methods of making the same and more particularly to identification cards having required characters, designs and/or embossings and also engraved images which have a high durability and no projections on the surface and methods of making the same.

There are already known such various identification cards as, for example, credit cards, I.D. cards, bank cards, cash dispenser cards, oil cards, key cards, consultation tickets, commutation tickets and licenses. Various methods have been attempted to identify the users of such identification cards.

For example, there are known a method wherein the sign of the user is made on the base material of the card and is identified when the card is to be used, a method wherein the face picture of the user is formed by a printing means on the base material of the card and a method wherein the face photograph of the user is pasted on the base material of the card.

Further, it is attempted to identify the user of the card by combining these methods as mentioned above.

However, these identification cards such as cards which are used in these methods are not perfect in preventing its forgery. When the card of the user has been stolen or lost, for example, the sign may be imitated or the face photograph may be replaced, thus the card may be illegally used and unexpected damages may be often caused.

Further, in the method wherein the face picture of the user is formed by a printing means, one printing plate must be made to make one identification card and therefore there is a defect that the cost of making the card is very high.

Also, in the above mentioned method wherein the face photograph of the user is pasted, the thickness of the base material of the card is increased by the photograph part and there is a defect that, for example, in the case of identifying the user by a mechanical search by utilizing a magnetism or the like, the adaptability to the mechanical treatment will be often impaired.

Further, in such method as is mentioned above, the sign, the face picture of the face photograph of the user expressed on the base material of the card is so low in the durability as to be damaged, for example, by a rubbing action or the like during the use for a long time and to lose the function of identifying the user of the card until it can be no longer used.

In addition to such methods as are mentioned above, there are known, for example, a method wherein the photographic printing paper on which the face picture is developed is used as the base material itself of the card or a method wherein a silver salt is applied to an aluminum plate and the face photograph or the like is developed on said aluminum plate.

However, such method is so low in the mechanical properties forming embossings or the like and in the durability that it is not desirable.

An object of the present invention is to provide an identification card by which the user can be very simply identified.

Another object of the present invention is to provide an identification card by which the forgery can be perfectly prevented.

A further object of the present invention is to provide an identification card which is so flat and smooth on the surface as to be applicable to a mechanical search.

Another object of the present invention is to provide an identification card which is so high in the durability as to be used for a long time.

A further object of the present invention is to provide a method of making such identification cards as are mentioned above very simply and cheaply.

As a result of making various researches on identification cards to attain the above mentioned objects, we have now found an identification card wherein a colored layer is provided on the base material of the card, the part of the above mentioned colored layer is engraved to be in the form of fine lines or points with an electronic engraving plate making machine such as electronic engraver by using the face photograph of the user of the card as a draft so that, by regulating the ratio of the surface areas of the engraved part and unengraved part, the differences in the color thickness and luster may be expressed and as a result required characters, designs or embossings and also any engraved image of the face of the user which have a high durability and no projections on the surface of the card may be formed, the user can be identified very simply and the forgery can be perfectly prevented.

One feature of the present invention is an identification card wherein any required characters, designs and embossings are made on the base material of the card and an engraved image by which the user can be identified and which has no projections is made in the part of a colored layer provided on the above mentioned base material of the card.

Another feature of the present invention is a method of making the above mentioned identification card characterized by making any required characters, designs and embossings on the base material of the card, further providing a colored layer on the above mentioned base material of the card and then engraving the part of said colored layer to be in the form of fine lines and points so that, by regulating the ratio of the surface areas of the engraved part and unengraved part, the differences in the color thickness and luster may be expressed to form any engraved image by which the user can be identified.

The identification card according to the present invention and the method of making the same shall be explained in detail with reference to the drawings.

IN THE DRAWINGS

There are various manners of the method of making identification cards according to the present invention. Some of them shall be described.

Figure 1:
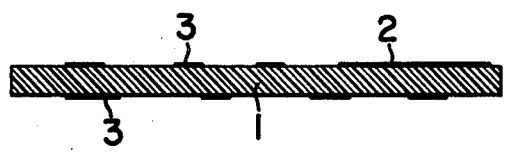
FIGS. 1, 3 and 5 are partly magnified sectioned views showing the formation of a card base material in the method of making cards according to the present invention.
Figure 2:
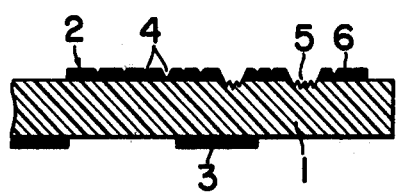
FIGS. 2, 4 and 6 are partly magnified sectioned views showing the formation of an engraved image part in an identification card in which the engraved image is formed by engraving the part of the colored layer on the base material of the card shown in the above mentioned FIGS. 1, 3 and 5.

In the present invention, first of all, as shown in FIG. 1, on a card base material 1, a colored layer 2 is applied to a part in which an engraved image by which the user can be identified is to be provided and any patterns 3 of characters, signs and designs required for the identification card are applied to the other part and then, as shown in FIG. 2, the part of the above mentioned colored layer 2 is engraved with, for example, an electronic engraving plate making machine such as electronic engraver by using face photograph of the user as a draft so that many concave holes or cutout portions 4 may be made, variations of the color thickness and luster may be expressed by the above mentioned engraved parts or cutout portions 5 and unengraved parts 6 to form any engraved image of the face image to identify the above mentioned user and thus an identification card according to the present invention may be obtained.

Figure 3:
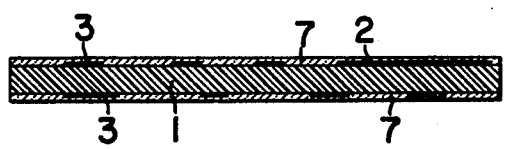
Figure 4:
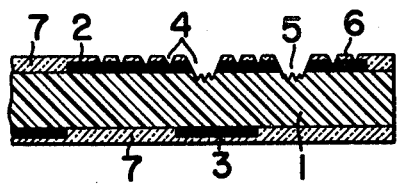

Further, in the present invention, as shown in FIG. 3, as mentioned above, a colored layer 2 and any patterns 3 are applied to a card base material 1, then, in order to protect said patterns 3, for example, a transparent resin film or sheet is laminated to provide a surface protecting layer 7, then, as shown in FIG. 4, in the same manner as is mentioned above, the part of the colored layer 2 is engraved from above the surface protecting layer 7 with, for example, an electronic engraving plate making machine such as electronic engraver by using the face photograph of the user as a draft so that many concave holes 4 may be made, variations of the color thickness and luster may be expressed by the engraved parts 5 and unengraved parts 6 to form any engraved image of the face image to identify the user and thus an identification card according to the present invention may be obtained.

Figure 5:
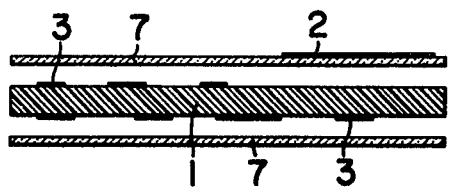
Figure 6:
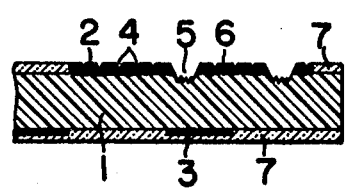

Further, in the present invention, as shown in FIG. 5, any pattern 3 of characters, signs and/or designs required for the identification card is provided on the front surface and/or back surface of the card base material 1 except the part in which an engraved image by which the user can be identified is to be provided, on the other hand, a colored layer 2 is formed on a transparent resin film or sheet used to provide a surface protecting layer 7 to protect said patterns 3, then the above mentioned card base material 1 and the above mentioned transparent resin film or sheet are laminated, for example, by heat-pressing and then, in the same manner as is mentioned above, the part of the colored layer 2 is engraved with a electronic engraving plate making machine such as electronic engraver by using the face photograph of the user as a draft so that, as in FIG. 6, many concave holes 4 may be made, variations of the color thickness and luster may be expressed by the above mentioned engraved parts 5 and unengraved parts 6 to form any engraved image of the above mentioned face image to identify the user and thus an identification card according to the present invention may be obtained.

Further, in the above mentioned third method, in the case of laminating the card base material 1 and the transparent resin film or sheet as a surface protecting layer 7 by heat-pressing, the colored layer 2 may be embedded in and strongly fixed to said transparent resin film or sheet to form an integral flat smooth surface and an engraved image high in the durability can be made.

Also, in the above mentioned third method, the colored layer 2 is expressed on the surface of the lamination but may be provided between the layers of the card base material 1 and the transparent resin film or sheet of the lamination so made of them.

By the way, such manners of making identification cards as are mentioned above are to show some manners of the method of making identification cards according to the present invention. The present invention is not limited to such methods as are mentioned above.

In the present invention, for the card base material 1, there can be used a film or sheet of such known synthetic resin as, for example, a polyvinyl chloride series resin, polyvinylidene chloride series resin, polystyrene series resin, ABS resin, such polyolefin series resin as of polyethylene or polypropylene, acryl series resin, polycarbonate resin, polyester series resin or polyamide series resin, any lamination of them or a lamination made by laminating any of them, any paper and a metal foil or the like.

Figure 7:
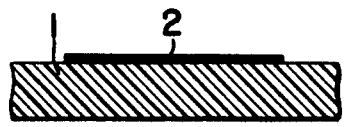
FIGS. 7, 8 and 9 are partly magnified sectioned views showing a manner of providing a colored layer on the base material of the card in the method of making cards according to the present invention.

In the present invention, for the method of providing the colored layer 2 on the card base material 1, there may be used any method wherein a colored layer of a color different from the color of the card base material 1 can be formed by, for example, a method wherein, as shown in FIG. 7, a colored layer 2 is formed by applying, printing or drawing a paint or ink composition having a resin and coloring agent as main components on any card base material 1, for example, by such ordinary painting process as a brush-painting, spatula painting, roll-coating process or gravure coating process, such ordinary printing process as a gravure printing system, offset printing system, relief printing system, screen printing system or transfer printing system or such ordinary drawing process as by hand or with a writing brush or a method wherein a colored layer 2 is formed by laminating a colored resin film or sheet on any card base material 1 by an ordinary laminating process.

Figure 8:

Further, in the present invention, as shown in FIG. 8, the card base material 1 provided with the colored layer 2 as mentioned above is heated and pressed, for example, by using a heating plate or heating roll so that the above mentioned card base material 1 and colored layer 2 may be heat-melted to be heat-fused or heat-bonded, said colored layer 2 may be embedded in said card base material 1 and both may become integral to form a flat smooth surface with the colored layer 2.

The heating and pressing treatment to be carried out after the colored layer 2 is provided in the card base material 1 as mentioned above in the present invention shall be explained more particularly. Such treatment can be made, for example, by a process wherein a flat plate heat press is utilized or a process wherein a heated roll press is utilized. The heating and pressing conditions in such process as is mentioned above are different depending on the materials forming the card base material 1 and colored layer 2 but a temperature of about 90° to 330°C., pressure of about 1 to 50 kg/m² and time of about 3 to 20 minutes are preferable. Further, the treatment may be made in one step or two steps so that the card base material 1 and colored layer 2 may be heat-melted to be heat-fused or heat-bonded, the colored layer 2 may be embedded in the above mentioned card base material 1 and they may become integral to form a flat smooth surface high in the durability.

According to the present invention, for example, when a colored layer 2 of a thickness of about 15 microns is provided at first, the thickness of the colored layer 2 embedded by being heat-fused or heat-bonded by such heating and pressing treatment as is mentioned above will be about 12 microns. In such case, when it is embedded, any excess of the colored layer 2 will be pushed out on the periphery of the card base material 1 but will be so slight in the amount as to have no influence on the formation standard of the card.

By the way, in the present invention, as mentioned above, any card base material 1 provided with a colored layer 2 is heated and pressed so that the above mentioned card base material 1 and the colored layer 2 may be heat-fused to heat-bond or heat-adhere them and said colored resin layer may be embedded in said card base material 1 to form an integral flat smooth surface. Therefore, it is desirable to select and use materials having an affinity and heat-fusibility or heat-bondability with each other for the materials forming the card base material 1 and colored layer 2. Therefore, in the present invention, it is preferable to combine and use thermoplastic resins showing a thermoplasticity by heat and having a heat-fusibility for the materials forming the card base material 1 and colored resin layer 2.

In the present invention, in the card made by providing a colored layer 2 on such card base material 1 as is shown in the above mentioned FIG. 7 and forming any engraved image of a face by applying such engraving treatment as is mentioned above, the surface of the above mentioned colored layer 2 is hardly always flat or smooth and the physical strength of the colored layer 2 itself and the bonding force between the card base material 1 layer and the colored layer 2 are so low that the colored layer 2 is likely to peel off during the engraving treatment and it is difficult not only to form a comparatively clear engraved image but also to obtain a card having an image so high in the durability as to be used for a long time. However, in the card made, as mentioned above, by providing a colored layer 2 on a card base material 1, then heating and pressing them so that the above mentioned card base material 1 and colored layer 2 may be heat-melted and heat-fused or heat-bonded together, the above mentioned colored layer 2 may be embedded in the above mentioned card base material 1 and both of them may become integral to form a flat smooth surface and then engraving the part of the above mentioned colored layer 2, there are no such problems as are mentioned above and the image is high in the durability. Therefore, such card is particularly preferable.

Further, in the present invention, instead of providing the colored layer 2 directly on the card base material 1 as mentioned above and heating and pressing them, as shown in the above mentioned FIG. 5, a colored layer 2 may be provided on a transparent resin film or sheet used to form a surface protecting layer 7 to protect any patterns 3 of required characters, signs and/or designs provided on a card base material 1 and then the above mentioned card base material 1 and transparent resin film or sheet may be laminated by heat-pressing so that the colored layer 2 may be embedded in the above mentioned transparent resin film or sheet or card base material 1.

Figure 9:

Also, in the present invention, as shown in FIG. 9, the colored layer 2 can be formed by impregnating the surface of a card base material 1 with such coloring agent as a dye or pigment by such ordinary dyeing process as, for example, a sublimation transfer system or a solvent penetrating dyeing system.

In the present invention, the colored layer 2 formed by such method as is mentioned above can be provided on the entire surface or only the part required to form an engraved image to identify the user on any card base material 1 and its thickness is free but is preferably about 3 to 40 microns as the engraved image must be formed. In case the above mentioned thickness is less than 3 microns, it will be difficult to attain the expected object. If it is more than 40 microns, it will be difficult to form a flat smooth surface of any card base material 1 by embedding the colored layer 2. Therefore it is not desirable.

Further, in the present invention, a multi-colored layer 2 may be formed by providing two or more colored layers 2 formed by such method as is mentioned above. In such case, a picture having a multi-color effect can be formed.

For the resin in the paint or ink composition to be used in the case of providing the colored layer 2 in the present invention, there can be used, for example, homopolymers or copolymers of such monomer as vinyl halide such as vinyl chloride or vinylidene chloride; styrene or its derivatives; vinyl ester such as vinyl acetate; allyl alcohol or allyl ester; unsaturated carboxylic acid such as acrylic acid, methacrylic acid, itaconic acid, crotonic acid, maleic acid or fumaric acid; an ester derivatives, nitrile derivatives or acid amide derivatives of the above mentioned unsaturated carboxylic acids; an N-methylol derivatives or N-alkyl methylol ether derivatives of the acid amide derivatives of the above mentioned unsaturated carboxylic acids; glycidyl acrylate; glycidyl methacrylate; allyl glycidyl ether; vinyl isocyanate; allyl isocyanate; 2-hydroxyethyl acrylate or methacrylate; 2-hydroxypropyl acrylate or methacrylate; ethyleneglycol monoacrylate or -methacrylate; ethyleneglycol di-acrylate or -methacrylate; maleic anhydride; itaconic anhydride; methyl vinyl ketone; methyl vinyl ether; butadiene; ethylene; propylene; dimethylaminoethyl methacrylate; vinyl pyridine; vinyl pyrrolidone; tert-butylaminoethyl methacrylate or a monoallyl ether of a polyhydric alcohol; a polyvinyl alcohol, polyvinyl butylal, polyvinyl formal, polyamide series resin, polyester series resin, phenol series resin, melamine series resin, urea series resin, urethane series resin, amino acid series resin, petroleum resin, cumarone resin, epoxy series resin, ketone aldehyde resin, chlorinated rubber, cyclic rubber, cellulose nitrate, methyl cellulose, ethyl cellulose, carboxymethyl cellulose, acetyl butyl cellulose, acetyl propionyl cellulose, ethyloxyethyl cellulose, rosin, its derivative, any natural resin or its processed resin.

In the present invention, for the coloring agent in the paint or ink composition to be used in the case of providing the colored layer 2, there can be used such known coloring agent as, for example, any inorganic pigment or any organic dye or pigment.

Concretely, there can be used such inorganic pigment as, for example, calcium carbonate, barium sulfate, clay, talc, titanium white, carbon black, yellow lead, cadmium yellow, chromium vermilion, cadmium red, navy blue, ultramarine or iron oxide or such organic dye or pigment as an azo series dye or pigment, vat series dye or pigment, phthalocyanin series dye or pigment, triphenyl methane series dye, its dyeing lake, a quinacrydone series pigment, irgazine series pigment or dioxazine series pigment.

In the present invention, for the paint or ink composition having a resin and coloring agent as main components, there can be used an ordinary paint or ink composition prepared by using as a main component one or a mixture of two or more of such resins as are mentioned above, adding to it one or a mixture of two or more of such coloring agents as are mentioned above, further, as required, adding any of such known additives as, for example, a plasticizer, stabilizer, wax, grease, drier, auxiliary drier, curing agent, emulsifier, viscosity increasing agent and filler and well mixing the mixture with a solvent or diluent together with a dispersing agent.

Further, in the present invention, for the colored resin film or sheet to be used in the case of providing the colored layer 2, there can be used a colored film or sheet obtained from such known resin as, for example, such polyolefin series resin as a polyethylene or polypropylene, a polyester, polyvinyl chloride, polyvinylidene chloride, polystyrene, polyacryl series resin, polycarbonate, polyamide or polyvinyl alcohol.

In the present invention, for the process of laminating such colored resin film or sheet as is mentioned above, there can be used such ordinary process as, for example, an adhesive painting laminating process or heat-melting laminating process.

Further, in the present invention, for the process of applying such patterns 3 required for an identification card as of characters, signs and designs to the card base material 1, there can be used such ordinary printing method as, for example, a gravure printing system, offset printing system, relief printing system, screen printing system or transfer printing system.

For the ink composition to be used in such printing method as is mentioned above, there can be used also the above mentioned paint or ink composition to be used in the case of providing the colored layer 2.

Further, in the present invention, for the transparent resin film or sheet to be used to provide the surface protecting layer 7 on the card base material 1, there can be used a film or sheet obtained in an ordinary manner from such known resin as, for example, such polyolefin series resin as a polyethylene or polypropylene, a polyester, polyvinyl chloride, polyvinylidene chloride, polystyrene, polyacryl series resin, polyamide or polyvinyl alcohol.

In the present invention, for the process of laminating such transparent resin film or sheet as is mentioned above on the card base material 1, there can be used such ordinary process as, for example, a binder painting laminating process or a heating and pressing heat-melting laminating process.

By the way, in the present invention, the above mentioned colored layer 2 can be also simultaneously embedded in the above mentioned resin film or sheet or the card base material by providing the colored layer 2 on such transparent resin film or sheet as is mentioned above and then heating and pressing the above mentioned resin film or sheet on the card base material 1 so as to heat-melt and laminate it.

Also, in the present invention, instead of laminating such transparent resin film or sheet as is mentioned above, the surface protecting layer 7 can be formed by applying in an ordinary manner a resin composition having as a main component of the vehicle the above mentioned resin to be used in the case of providing the colored layer 2.

In the present invention, such surface protecting layer 7 as is mentioned above protects such patterns 3 as of required characters, signs and/or designs provided on the card base material 1 or acts as a reinforcement for the card base material 1.

The process of engraving the part of the colored layer 2 in the above mentioned present invention shall be explained more particularly. Such process can be made by utilizing such known method as, for example, an electronic engraving plate making method wherein, for example, a plane scanning engraving type electronic engraved plate making machine (for example "Vario-Klischograph") by which a photographic relief plate can be obtained directly from a draft is used.

Figure 10:
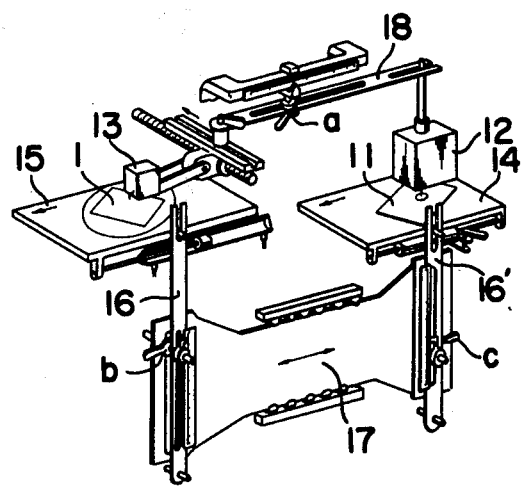
FIG. 10 is a mechanism view showing the mechanism of an apparatus for forming engraved images by engraving the part of the colored layer provided on the base material of the card in the method of making cards according to the present invention.

The engraving method by utilizing the above mentioned plane scanning engraving type electronic engraved plate making machine shall be explained concretely. FIG. 10 is a mechanism view of an apparatus for making the same engraved image as an image on such photographic draft 11 as of a face photograph directly on the part of the colored layer 2 provided on the above mentioned card base material 1 from such photographic draft 11 as of the face photograph.

That is to say, in FIG. 10, 12 is a scanning head having a light source lamp and a light multiplying tube and 13 is an engraving head having a vertically vibrating engraving needle. Below these heads 12 and 13 are respectively a draft stand 14 on which a photographic draft 11 is mounted and an engraving stand 15 on which a card base material 1 provided with a colored layer 2 is mounted. The two stands 14 and 15 are connected with each other through a swing arm 17 through swing levers 16 and 16'.

A spotlight from the light source within the scanning head 12 lights one point of the photographic draft 11, the reflected light from this point enters the light multiplying tube, a light current corresponding to the amount of the reflected light from the photographic draft 11, that is, to the thickness of the photographic draft 11 is produced from the light multiplying tube and this light current passes through a proper calculating amplifying circuit and controls the depth of the needle of the engraving head 13 engraving into the part of the colored layer 2 provided on the card base material 1.

As the tip of the needle is made pyramidal, if it engraves in deeper, the area of the concave hole will become larger and the area left on the surface of the colored layer 2 provided on the card base material 1 will become smaller. That is to say, the highlight part of the photographic draft 11 will be indicated.

On the other, if it engraves in to be shallower, the area of the concave hole will become smaller, the left area will become larger and the shadow part of the photographic draft 11 will be indicated.

The number of lines in the reciprocating direction of the engraving stand 15 is determined by adding an intermittent motion having a fixed period in response to the desired number of lines and the velocity of the reciprocating motion of the stand to a vertical motion corresponding to the thickness of the needle.

When one line has been engraved by one reciprocating motion of the engraving stand 15, the engraving head 13 and the scanning head 12 connected with it through a laterally feeding lever 18 will move laterally by one pitch corresponding to the number of lines and again one line will be engraved by the reciprocating motion of the engraving stand 15.

By such operation as is mentioned above, the part of the colored layer 2 provided on any card base material 1 is engraved and such image as a face image on such photographic draft 11 as the face image can be formed in the part of said colored layer 2.

By the way, by varying the positions of fulcra $a$, $b$ and $c$ of the above described swing lever and cross feed lever, the image can be easily contracted or enlarged.

Figure 11:
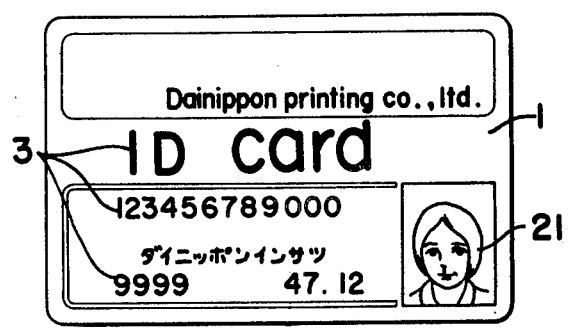
FIG. 11 is a plane view showing the card of the present invention.

In the card of the present invention made by such operation as is mentioned above, as shown in FIG. 11, not only such patterns 3 as of characters, signs and/or designs required for an identification card are expressed on the card base material 1 but also such engraved image 21 to identify the user as the face of the user to identify the user is formed on the part of the colored layer 2 provided on the above mentioned card base material 1.

Figure 12:
FIG. 12 is a partly magnified sectioned view of an engraved image part showing the formation of the engraved image of the card shown in the above mentioned FIG. 11.

Further, as shown in FIG. 12, the above mentioned engraved image 21 is formed of engraved parts 5 made by engraving the part of the colored layer 2 provided on the card base material 1 so as to be in the form of fine lines or points and unengraved parts 6 and the unit of said image consists of an assembly of many concave holes 4 having a luster or tone different from that of the surface of the above mentioned card base material and is sighted as expressed as the luster and color thickness in the unit of such image as is mentioned above depending on the arranged density, depth or size of said concave holes 4.

By the way, in the card according to the present invention, a magnetic pattern required for searches or a decorative relief pattern may be expressed.

As evident from the above explanation, in the card according to the present invention, together with such patterns as of characters and/or designs required for an identification card, a very clear and stable engraved image flat and smooth on the surface, high in the durability and formed of the card base material itself is formed to identify the user. It can be used semipermanently.

Therefore, for example, the card according to the present invention can very simply identify the user and, even in case said card is stolen or lost, as an engraved image is formed in the card base material itself as mentioned above, it will be quite impossible to forge and illegally use it.

Further, in the card according to the present invention, even though an engraved image is formed as mentioned above, as such part is of the same flat smooth surface as of the card base material, its adaptability to various apparatus to be used to treat cards for searches or the like will not be impaired.

Also, in the card according to the present invention, as such engraved image as the face image of the user is formed on the part of the colored layer provided in the card base material directly from a photographic draft or the like, there is an advantage that mistakes in issuing cards can be reduced to be fewer than in the conventional system wherein a face photograph or the like is provided on the card while checking the classification number of the card and the user.

Further, in the card according to the present invention, the photographic draft or the like may be either a positive or negative, even a colored photograph can be used as it is and further the image can be easily contracted or enlarged, therefore there is a convenience that any draft desired by the user can be used and the engraving process can be made within a few minutes. Thus the card can be made very simply and cheaply.

The card according to the present invention can be used in various fields as such identification card as, for example, a credit card, I.D. card, bank card, cash dispenser card, oil card, key card, consultation ticket, commutation ticket or license and is very useful.

The present invention is illustrated by the following examples.

EXAMPLE 1

Only a part expected to express any image identifying the user on a base material of a transparent polyvinyl chloride resin film (of a thickness of 0.1 mm) was wholly printed with a screen printing ink (No. 8000 produced by Toyo Ink Manufacturing Company, Ltd., Japan) and the ink was dried to obtain a colored layer. Then there were laminated the transparent vinyl chloride resin film provided with the above mentioned colored layer on the upper side, a white polyvinyl chloride resin core provided with characters and designs required for an identification card as an intermediate layer and the transparent vinyl chloride resin film on the lower side so that the above mentioned colored layer may be on the surface. Then the three layers were pressed with a pressure of 20 kg/cm$^2$ and were heated as pressed at 150°C. for 12 minutes to obtain a card of a total thickness of 0.76 mm.

The printing ink was heat-fused and pushed in to a depth of about 12 microns from the surface of the polyvinyl chloride resin film to obtain a colored layer made integral with the base material.

The thus obtained colored layer was engraved to a maximum depth of 80 microns with "Vario-Klischograph" engraving machine (manufactured by Dr. Ing. Rudolf Hell, Germany) by using the face photograph of the user of the card as a draft to express an engraved image which is in the form of fine lines and points and which has a photographic tone identifying the user on the part of the above mentioned colored layer and as a result a flat smooth image very high in the durability could be formed to obtain an identification card.

EXAMPLE 2

A vinyl chloride-vinyl acetate copolymer film (of a thickness of 18 microns) which was colored red was laminated on a transparent polyvinyl chloride resin film (of the thickness of 0.1 mm), but only a part expected to express such image as the face image identifying the user.

Then a white polyvinyl chloride resin core provided with characters and designs required for an identification card as an intermediate layer and a transparent vinyl chloride resin film as a lower layer were laminated below the above mentioned polyvinyl chloride resin film. Then the above mentioned four layers were pressed under a pressure of 20 kg/cm$^2$ and were heated as pressed at about 150°C. for 12 minutes to obtain a card of a total thickness of about 0.76 mm.

The above mentioned red vinyl chloride-vinyl acetate copolymer film was heat-melted and was strongly embedded in the polyvinyl chloride resin film to form a colored layer made integral with the base material.

When the part in which the red vinyl chloride-vinyl acetate copolymer film was embedded of the card obtained in the above was then engraved by the same process by using the same precision engraving machine as in Example 1 by using a face photograph as a draft, a very clear face image high in the durability could be formed to obtain an identification card.

EXAMPLE 3

Only a part expected to express the face image to identify the user was gravure-printed with the below mentioned ink composition on a polyvinyl chloride resin film (of a thickness of 0.76 mm) and the ink was dried to provide a colored layer.

Then the film was heated and pressed with a heat-pressing machine under 10 kg/cm$^2$ at 140°C. for 10 minutes.

The printing ink was heat-fused and pushed in to a depth of about 7 microns from the surface of the polyvinyl chloride resin film to obtain a colored layer made integral with the base material.

Such patterns as characters and/or designs required for an identification card were provided in the other part than the colored layer of the thus obtained colored sheet, said colored sheet was engraved with Vario-Klischograph engraving machine (manufactured by Dr. Ing. Rudolf Hell, Germany) by using the face photograph of the user of the card as a draft to express an engraved face image which is in the form of fine lines and points and which has a pthotographic tone.

With a film of such resin as a polyester resin, polyamide resin or polyvinyl chloride-polyacrylonitrile copolymer instead of the above mentioned polyvinyl chloride resin, the same results were obtained.

| Ink composition: | parts by weight |
|---|---|
| Iketone Fast Blue Extra (produced by Ikeda Chemical Co., Ltd.) | 10 |
| Cellulose acetobutyrate (produced by Bayer Co.) | 8 |
| Xylene | 65 |
| Butanol | 17 |

EXAMPLE 4

A blue-colored vinyl chloride-vinyl acetate copolymer film (of a thickness of about 15 microns) was laminated only on a part expected to express the face image identifying the user on a polyvinyl chloride resin film (of a thickness of about 0.75 mm) to provide a colored resin layer and then the colored layer was heated and pressed at 140°C. under about 10 kg/cm$^2$ for 10 minutes. By the above mentioned treatment, the blue vinyl chloride-vinyl acetate copolymer film was embedded in the polyvinyl chloride resin film and a flat smooth surface made integral with the base material was formed.

Then such patterns as of characters, signs and/or designs required for an identification card were provided on the other part of the above mentioned colored layer.

A flat smooth face image high in the durability could be obtained by engraving the part in which the above mentioned blue vinyl chloride-vinyl acetate copolymer was embedded with a precision engraving machine by using the face photograph as a draft in the same manner as in Example 1 to obtain an identification card.

EXAMPLE 5

A card having a colored layer was made by pressing and heating a colored styrene film (of a thickness of 15 microns) under 20 kg/cm$^2$ at 120°C. for 5 minutes on a part expected to express the face image of the user on a base material of an ABS resin film (of a thickness of 1 mm). Then such patterns as of required characters and/or designs were provided on the other part of the colored layer of said card and then said card was engraved with the same Vario-Klischograph as in Example 1 to obtain an identification card having the desired engraved image.

EXAMPLE 6

A colored low density polyethylene film (of a thickness of 20 microns) was heated and pressed to a high density polyethylene film (of a thickness of 1 mm) in the same manner as in Example 5.

For the pressing process, the film was cold-pressed at first under 30 kg/cm$^2$ for 1 minute and was then heated and pressed at 140°C. under 20 kg/cm$^2$ for 3 minutes to obtain a card in which the surface was flat and smooth and the colored layer and base material were made integral with each other.

Then such patterns as of required characters, signs and/or designs were provided on the uncolored layer part of the above mentioned card and then said card was engraved in the same manner as in Example 1 to obtain an identification card having an engraved image.

EXAMPLE 7

Two red and yellow vinyl chloride-vinyl acetate copolymer films (of a thickness of 20 microns each) were used for the colored film in Example 6 and were pressed in the same manner to a base material of a white polyvinyl chloride resin core (of a thickness of 1 mm).

The colored layer of the obtained film was of two orange-colored layers. In the case of engraving said colored layer with Vario-Klischograph, a mechanical circuit was set with such tones that the concave hole might be of less than 20 microns in the part of a thickness of the photographic draft of more than 1.0, 20 to 40 microns in the part of an intermediate thickness of more than 0.3 and 40 to 80 microns in the lighted part of a thickness of 0.3 to 0.

The obtained engraved image had a multi-color effect that the lighted part was white, the intermediate tone was yellow and the shadow part was orange.

EXAMPLE 8

The below mentioned transfer sheet was pressed under 20 kg/cm$^2$ to a base material of a polyvinyl chloride sheet of a thickness of 0.75 mm and they were heated as pressed at 150°C. for 5 minutes. The dye penetrated to a depth of about 10 microns from the surface of the polyvinyl chloride to obtain a colored layer. On the other hand, required characters and the like were provided on the other part than the above mentioned colored layer, then the thus obtained colored sheet was engraved to a maximum depth of 80 microns with a precision engraving machine to obtain an identification card having an engraved face image similar to that obtained in Example 1.

The specification of the transfer sheet was as follows:

Transfer original:
Parchment paper of 30 g/m²

| Ink composition: | Parts |
|---|---|
| Resolin Blue BRL (produced by Bayer Co.) | 15 |
| Ethyl Cellulose N-7CP (produced by Hercules Co.) | 10 |
| Xylene | 60 |
| Butanol | 15 |

The original was coated on the entire surface with the above mentioned ink or was partly coated by gravure printing in case partial image lines were required to obtain a transfer sheet.

EXAMPLE 9

A polystyrene film of a thickness of 0.15 mm was made a base material, only a part expected to express designs was wholly printed by gravure printing with the below mentioned ink composition, the ink was dried, then an ABS resin sheet of a thickness of 0.6 mm was pasted to it with a binder and they were pressed and heated under 10 kg/cm² at 120°C. for 5 minutes. The colored layer reached a depth of 8 microns from the surface. It was engraved in the same manner as in Example 1 to obtain an identification card as described in Example 1.

| Ink composition: | Parts |
|---|---|
| Iketone Fast Blue Extra (produced by Ikeda Chemical Co., Ltd.) | 10 |
| Cellulose acetobutyrate (produced by Bayer Co.) | 8 |
| Xylene | 65 |
| Butanol | 17 |

EXAMPLE 10

Patterns such as characters and designs required for an identification card were provided on the surface of a white polyvinyl chloride resin core and a screen printing ink (No. 8000 produced by Toyo Ink Manufacturing Company, Ltd., Japan) was wholly printed on a part expected to express any image identifying the user and the ink was dried to form a colored layer.

Then transparent vinyl chloride resin films (of a thickness of 0.025 mm each) were laminated respectively above and below the above mentioned polyvinyl chloride resin core, then the three layers were heated and pressed at 150°C. under a pressure of 20 kg/cm² to obtain a card base material of a total thickness of 0.76 mm.

Then the part of the colored layer of the above mentioned card base material was engraved to a maximum depth of 80 microns with Vario-Klischograph engraving machine (manufactured by Dr. Ing. Rudolf Hell, Germany) to express the face image identifying the user to obtain an identification card which is very high in the durability.

By the way, even when the colored layer 2 was provided on the back surface of the upper transparent vinyl chloride resin film instead of providing it on the surface of the white polyvinyl chloride resin core as mentioned above and was laminated so as to be provided as an intermediate layer between them, the similar results were obtained.

Further, even when a colored vinyl chloride-vinyl acetate copolymer film (of a thickness of 0.018 mm) was used for the colored layer, the similar results were obtained.

EXAMPLE 11

Only a part expected to express the face image to identify the user was gravure-printed with the below mentioned ink composition on a polyvinyl chloride resin film (of a thickness of 0.76 mm) and the ink was dried to provide a colored layer.

Then such patterns as characters and/or designs required for an identification card were provided in the other part than the colored layer of the thus obtained colored sheet, said colored sheet was engraved with Vario-Klischograph engraving machine (manufactured by Dr. Ing. Rudolf Hell, Germany) by using the face photograph of the user of the card as a draft to express an engraved face image which is in the form of fine lines and points and which has a photographic tone.

With a film of such resin as a polyester resin, polyamide resin or polyvinyl chloride-polyacrylonitrile copolymer instead of the above mentioned polyvinyl chloride resin, the same results were obtained.

| Ink composition: | parts by weight |
|---|---|
| Iketone Fast Blue Extra (produced by Ikeda Chemical Co., Ltd.) | 10 |
| Cellulose acetobutyrate (produced by Bayer Co.) | 8 |
| Xylene | 65 |
| Butanol | 17 |

EXAMPLE 12

Only a part expected to express the face image to identify the user was painted with the below mentioned paint composition on a polyvinyl chloride resin film (of a thickness of 0.76 mm) and the paint was dried to provide a colored layer.

Then such patterns as characters and/or designs required for an identification card were provided in the other part than the colored layer of the thus obtained colored sheet, said colored sheet was engraved with Vario-Klischograph engraving machine (manufactured by Dr. Ing. Rudolf Hell, Germany) by using the face photograph of the user of the card as a draft to express an engraved face image which is in the form of fine lines and points and which has a photographic tone.

With a film of such resin as a polyester resin, polyamide resin or polyvinyl chloride-polyacrylonitrile copolymer instead of the above mentioned polyvinyl chloride resin, the same results were obtained.

| Paint composition: | Parts by weight |
|---|---|
| Copolymer of vinyl chloride-vinyl acetate (produced by Union Carbide Co. & Ltd.) | 25 |
| Phtharocyanine Blue (produced by Dainichi Seika Industrial Co., Ltd.) | 25 |
| Methyl ethyl ketone | 50 |
| Toluene | 50 |

EXAMPLE 13

Only a part expected to express the face image to identify the user was painted with the below mentioned paint composition on a polyvinyl chloride resin film (of a thickness of 0.76 mm) and the paint was dried to provide a colored layer.

Then the film was heated and pressed with a heat-pressing machine under 10 kg/cm$^2$ at 140°C. for 10 minutes.

The painted layer was heat-fused and pushed in to a depth of about 7 microns from the surface of the polyvinyl chloride resin film to obtain a colored layer made integral with the base material.

Then such patterns as characters and/or designs required for an identification card were provided in the other part than the colored layer of the thus obtained colored sheet, said colored sheet was engraved with Vario-Klischograph engraving machine (manufactured by Dr. Ing. Rudolf Hell, Germany) by using the face photograph of the user of the card as a draft to express an engraved face image which is in the form of fine lines and points and which has a photographic tone.

With a film of such resin as a polyester resin, polyamide resin or polyvinyl chloride-polyacrylonitrile copolymer instead of the above mentioned polyvinyl chloride resin, the same results were obtained.

| Paint composition: | Parts by weight |
|---|---|
| Copolymer of vinyl chloride-vinyl acetate (produced by Union Carbide Co. & Ltd.) | 25 |
| Phtharocyanine Blue (produced by Dainichi Seika Industrial Co., Ltd.) | 25 |
| Methyl ethyl ketone | 50 |
| Toluene | 50 |

We claim:

1. A method for manufacturing an identification card comprising the steps of:
   forming a base material,
   forming a colored layer, having a color different from the color of the base material, on at least a portion of the base material,
   heating and pressing the base material and the colored layer together to embed the colored layer into the base material and integrate it to the base material thereby forming a final flat card ready to be engraved,
   and engraving to varying depths a portion of the colored layer and part of the base material under the colored layer with an engraving machine to create an engraved image.

2. The method of claim 1 wherein the engraved portion of the colored layer and part of the base material is in the form of fine lines.

3. The method of claim 1 wherein the engraved portion of the colored layer and part of the base material is in the form of points.

4. The method of claim 1 wherein the engraved portion of the colored layer and part of the base material is in the form of fine lines and points.

5. The method of claim 1 wherein the step of forming the colored layer is achieved by printing.

6. The method of claim 1 wherein the step of forming the colored layer is achieved by painting.

7. The method of claim 1 wherein the step of forming the colored layer is achieved by laminating a film of colored resin to the base material.

8. The method of claim 1 wherein the step of forming the colored layer is achieved by impregnating a coloring agent into said portion of the base material.

* * * * *